(12) United States Patent
Velazco et al.

(10) Patent No.: US 6,214,788 B1
(45) Date of Patent: Apr. 10, 2001

(54) USE OF CUBEBOL AS A FLAVORING INGREDIENT

(75) Inventors: Maria Inés Velazco, Geneva; Laurent Wuensche, Meyrin; Patrice Deladoey, Geneva, all of (CH)

(73) Assignee: Firmenich SA, Geneva (CH)

( * ) Notice: Subject to any disclaimer, the term of this patent is extended or adjusted under 35 U.S.C. 154(b) by 0 days.

(21) Appl. No.: 09/536,703

(22) Filed: Mar. 28, 2000

(30) Foreign Application Priority Data

Mar. 31, 1999 (CH) .................................................. 0606/99

(51) Int. Cl.[7] ...................................................... A61K 7/46
(52) U.S. Cl. .............................................. 512/19; 420/650
(58) Field of Search ................................. 514/19; 426/650

(56) References Cited

U.S. PATENT DOCUMENTS

| | | | |
|---|---|---|---|
| 3,644,613 | 2/1972 | Moeller et al. | 424/49 |
| 3,991,178 | 11/1976 | Humbert et al. | 424/54 |
| 4,034,080 | * 7/1977 | Silverstein et al. | 424/84 |
| 4,060,091 | 11/1977 | Watson et al. | 131/9 |
| 4,454,111 | 6/1984 | Boden et al. | 424/58 |
| 4,459,425 | 7/1984 | Amano et al. | 568/666 |
| 5,266,592 | 11/1993 | Grub et al. | 514/452 |
| 5,545,424 | 8/1996 | Nakatsu et al. | 426/536 |
| 5,703,123 | 12/1997 | Pelzer et al. | 514/512 |

FOREIGN PATENT DOCUMENTS

| | | |
|---|---|---|
| 1192108 | 8/1985 | (CA) . |
| 24 33 165 | 1/1975 | (DE) . |
| 25 03 555 | 8/1975 | (DE) . |
| 26 08 226 | 9/1977 | (DE) . |
| 0 507 190 | 10/1992 | (EP) . |
| 0 583 651 | 2/1994 | (EP) . |
| 1 457 671 | 8/1976 | (GB) . |
| 56-083416 | 7/1981 | (JP) . |
| 60-14982 | 1/1994 | (JP) . |
| 60-16515 | 1/1994 | (JP) . |
| 2041941 | 8/1995 | (RU) . |
| 99/28288 | 6/1999 | (WO) . |

OTHER PUBLICATIONS

Butterbur & Sage Ltd., "Pure Essential Oils", 1998.
D. Salvatore et al., "Sesquiterpenes from the brown Alga Taonia atomaria", Phytochemistry (Oxford), vol. 37, No. 5, pp. 1327–1330 (1994), abstract.
M. Sumathykutty et al., "Essential oil constituents of some Piper species", Flavour and Fragrance Journal, vol. 14, No. 5, pp. 279–282 (1999), abstract.
Guenther, *The Essential Oils*, vol. II (1952).
Shankaracharya et al., "Studies on the Chemical Composition of Cubeb (Piper cubeba Linn.)", *Pafai Journal*, pp. 33–39 (Jan.–Mar. 1995).
Tanaka et al., "Synthesis of Cubebane–type Sesquiterpenoids and the Stereochemistry of Cubebol", *J. Chem. Soc. Perkin 1*, pp. 1721–1727 (1972).
Tanaka et al, J. Chem. Soc. Perkin 1, pp. 1721–1727, 1972.*

* cited by examiner

*Primary Examiner*—James H. Reamer
(74) *Attorney, Agent, or Firm*—Pennie & Edmonds LLP

(57) ABSTRACT

The use of (–)-cubebol, or (–)-(1R,4S,5R,6R,7S,10R)-7-isopropyl-4, 10-dimethyl-tricyclo[4.4.0.0(1,5)]decan-4-ol of the formula (I)

as a flavoring, and the foods and various other products flavored with cubebol.

12 Claims, No Drawings

USE OF CUBEBOL AS A FLAVORING INGREDIENT

BRIEF SUMMARY OF THE INVENTION

The present invention relates in particular to the flavor industry. More particularly, it relates to the use of (−)-cubebol, or (−)-(1R,4S,5R,6R,7S,10R)-7-isopropyl-4,10-dimethyl-tricyclo[4.4.0.0(1,5)]decan-4-ol of the formula

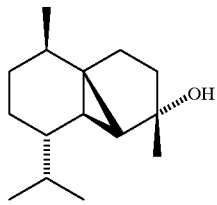

(I)

as a flavoring, and the foods and various other products flavored with cubebol.

BACKGROUND OF THE INVENTION

Cubebol is a compound found in nature, namely in cubeb oil which is isolated from berries of *Piper cubeba*, or true cubebs. A compound having a similar structure (see discussion below) is found in species of cubebs known as "false cubebs", which are not well defined and can comprise several species of Piper. The oil of true cubebs has long since been known in the flavor industry, but its use is strictly limited to a number of "exotic" applications, for example the flavoring of spicy sauces and bitter alcohols, or "bitters". This is due to the characteristic bitter, piquant and pungent flavor of the oil, which, as a result, does not lend itself to large-scale use in the flavor industry.

Cubeb oil is a complex mixture of around fifty compounds (see N. B. Shankaracharya et al, Pafai Journal Jan.–Mar. 1995, pp. 33–39). One constituent amongst these compounds which is well defined is the aforementioned cubebol, which has already been referred to in works dating from the 1950s and relating to the flavor and fragrance industry, for example in Guenther, The Essential Oils, Vol. II (1952). At that time, the structure of cubebol had not yet been clarified, and the name "cubebol" was used for a product extracted from false cubebs, while the oil of true cubebs yielded a product known as "cubeb camphor". The aforementioned work by Guenther, for example, refers on page 287 to a compound by the name of cubebol isolated from the oil of "false" cubebs and said not to be identical to a compound by the name of "cubeb camphor", isolated from the oil of true cubebs.

According to more recent work on cubebol, the two compounds are, with a fair amount of probability, the same (see F. Vanasek et al, Coll. Czech. Chem. Comm. 1960 (25), p. 919 and A. Tanaka et al, J. Chem. Soc. Perkin 1., 1972, p. 1721), although the identity of these two compounds has not actually been proved. From this point on, the name cubebol will be used to designate the compound of the formula (I) hereinabove which is isolated from the oil of true cubebs.

It is very surprising that cubebol has never been used in the flavor industry, despite the fact that cubebol and cubeb camphor have long been known, as is reflected in the work by Guenther, which states on page 287: "Cubebol as such is not used in our industry." This has remained the case until now.

A very current topic in the flavor industry is the search for molecules which have a delayed and prolonged refreshing effect when they come into contact with the mucous membranes of the mouth. This is due to the fact that a large number of compounds, in particular derivatives of (−)-menthol, are already known which have a pronounced refreshing effect developing rapidly in the oral cavity and lasting for around 10 to 15 minutes at the most. However, refreshing agents which have a longer-lasting effect are desired. Despite all the effort invested by chemists in the synthesis of new chemical substances or in structural modifications to compounds with a known refreshing effect (see e.g. applications DE-A-26 08 226, EP-A-507 190 and EP-A-583 651 filed by Haarmann & Reimer GmbH, and application PCT/IB98/01821 filed on 16.11.98 by the applicant), they have not succeeded in developing or finding substances having the desired quality of a long-lasting refreshing effect.

DETAILED DESCRIPTION OF THE INVENTION

The object of the present application is to provide a chemical compound having a refreshing effect which is perceptible for a longer period than the effect achievable with known refreshing compounds. We have found that the use of (−)-cubebol, or (−)-(1R,4S,5R,6R,7S,10R)-7-isopropyl4, 10-dimethyl-tricyclo[4.4.0.0(1,5)]decan-4-ol, as a flavoring enables this object to be achieved. When (−)-cubebol is incorporated into suitable foods or beverages as a flavoring, a refreshing effect develops in the mouth after a delay of approximately 1 to 2 minutes and lasts for approximately 30 minutes. To our knowledge, cubebol is the first refreshing agent to have this quality, making it particularly useful in the flavor industry.

Since cubebol itself has only a very weak smell and taste, it lends itself to all applications in the field of flavors. Beverages, iced products such as ice creams or sorbets, sweets, confectionery, dairy products, chewing gums, jams, cigarettes, chewing tobacco, pharmaceutical preparations and dental care products are non-limiting examples of its use.

Preferred applications, in which the prolonged effect is particularly welcome, are emulsion-based drinks, fruit juices, soft drinks, cold teas, chewing gums with and without sugar, sweets with and without sugar, pressed tablets, gelatin-based confectionery, fruit jams and jellies, alcoholic beverages, sorbets, dairy ice creams, tooth gels and toothpastes, mouth-washes and throat-washes. As general preferred applications, flavors with acid notes, flavors based on citrus fruits and the foods containing these flavors may be quoted.

Naturally, cubebol also lends itself to use in the field of perfumery. Non-limiting examples of this are shampoos, shower and bath gels, deodorants and anti-perspirants, after-shave lotions and balms, shaving foams, massage oils and perfumes.

In another preferred embodiment of the invention, cubebol is used in combination with other commercially available refreshing agents known to the skilled person, in particular the compounds derived from (−)-menthol, (−)-menthone and (−)-menthane. Non-limiting examples of these are the compounds described in application DE-A-26 08 226, in particular (−)-menthyl lactate; the compounds described in application EP-A-507 190, in particular (−)-menthone glyceryl ketal; the compounds described in application EP-A-583 651, in particular (−)-menthyl ethylene glycol carbonate and (−)-menthyl 1,2-propylene glycol carbonate; (−)-menthyl monosuccinate; (−)-menthyl 5-oxoprolinate; the compounds described in U.S. Pat. No. 5,545,424 and 4,459,425, in particular 1-glyceryl(−)-menthyl ether; the compounds described in U.S. Pat. No. 4,060,091, in particular N-ethyl-p-(−)-menthane-3-carboxamide; the compounds described in U.S. Pat. No. 3,644,613, in particular (−)-menthyl levulinate and (−)-menthyl acetylacetate; (−)-menthyl N-acetyl-glycinate, described in application DE-A-24 33 165, and the compounds described in application PCT/IB98/01821 filed by the applicant, in particular (−)-menthyl methoxyacetate and (−)-menthyl 3,6-dioxaheptanoate. Naturally, (−)-menthol as such also lends itself to use in combination with cubebol. Another class of suitable refreshing compounds are those disclosed in DE-A-25 03 555, in particular N,2,3-trimethyl-2-(1-methylethyl)-butanamide.

The use of cubebol in combination with at least one of the "conventional" refreshing compounds, in particular those mentioned hereinabove, provides a very distinctive refreshing effect. When the products containing the said combination of refreshing agents come into contact with the mucous membranes, for example of the mouth, the refreshing effect develops rapidly in the mouth, after approximately 30 to 90 seconds, and lasts for approximately 25 to 30 minutes. Such an effect cannot be achieved with known refreshing agents, the effect of which develops rapidly, but subsides after approximately 20 minutes at the most. In contrast, the use of cubebol alone gives rise to a delayed refreshing effect, only produced after more than 90 seconds, but remaining perceptible for a long time. The use of a combination of cubebol with at least one other known refreshing agent produces a rapid, long-lasting refreshing effect. One compound is not seen to have a negative effect on another, and the resulting refreshing effect, namely rapid and long-lasting, is entirely unknown.

Relative to the products into which it is incorporated, the cubebol will typically be used in concentrations of between 0.001% and 5% by weight, preferably between 0.002% and 1% by weight of these products. When cubebol is used in flavor concentrates, it will be present in quantities between 0.1% and 40% by weight, preferably between 0.5% and 25% by weight, relative to the total weight of the concentrate. It is even more preferable to use the cubebol in quantities of between 1% and 15% by weight relative to the total weight of the concentrate.

When the cubebol is used with other known refreshing agents, it will be used in a proportion of 30% to 300%, preferably approximately 50% to 200%, relative to the total quantity of the other agent or agents present.

In all the uses mentioned in the present application, the cubebol can be used in the form of an inclusion complex in α, β or γ cyclodextrins. This encapsulation has proved particularly advantageous because it allows the cubebol used to be reduced to levels ranging from approximately 60% to approximately 5% by weight relative to the quantities of cubebol used without the addition of cyclodextrin. Preferably, β-cyclodextrin will be used. The combination of cubebol and cyclodextrin is particularly advantageous in chewing gums.

Naturally, when the cubebol is used according to the invention, it will generally be used in the pure state or encapsulated in cyclodextrins. In other embodiments of the present invention, cubeb oil is used which is enriched with cubebol by at least 50% by weight. We have found that this percentage of cubebol ensures a refreshing effect when the oil is used in applications where the characteristic bitter, piquant taste of this oil is welcome, for example in the flavoring of spicy sauces, "bitters" and other applications well known to the skilled worker. An oil of exceptional quality is obtained when the cubebol-enriched base oil contains a very small amount of epi-cubebol, or (−)-(1R,4R,5R,6R,7S,10R)-7-isopropyl- 4,10-dimethyl-tricyclo[4.4.0.0(1,5)]decan-4-ol, of less than 5%, preferably less than 2% relative to the total weight of the oil. Since epi-cubebol itself has a very bitter taste and is therefore, inter alia, responsible for the pronounced bitterness of cubeb oil, a cubebol-enriched oil containing no or only a small amount of epi-cubebol will have a wider field of application than an oil containing epi-cubebol.

A grade of cubebol having organoleptic properties which make it suitable for use in the context of the present invention can, for example, be obtained as follows:

1440 g of cubeb oil (origin: Chauvet SA, Seillans, France, grade "absolute colourless" and containing 37% cubebol) are fractionated over a 100 cm ×4 cm Sulzer column with a reflux ratio of 50:1. The fractions distilling between 120° C. and 126° C./8 hPa are combined to give 168 g of cubebol with a purity of 88%.

The cubebol thus obtained has suitable organoleptic properties and can generally be used in this form according to the present invention. Superior grades of cubebol can be obtained e.g. by crystallisation of the product, obtained as described above, in an equivalent amount of acetone at −20° C., yielding cubebol with a purity greater than 94%.

The invention will now be described in further detail in the following examples of use, in which the abbreviations have the usual meaning in the art.

EMBODIMENTS OF THE INVENTION

Example 1

Preparation of Sweets

Orange-flavored sweets were prepared from boiled sugar, 1% citric acid and 0.1% of an orange flavor having the following composition:

| Ingredients | Parts by weight |
|---|---|
| Hexanal | 3 |
| Octanal | 2 |
| Dodecanal | 3 |
| Ethyl butyrate | 15 |
| Acetaldehyde | 30 |
| Orange essence | 947 |
| Total | 1000 |

These sweets, without anything else added, were then compared on a blind test by expert flavorists with sweets of the same composition to which cubebol had been added.

In the opinion of the flavorists, the addition of 0.04% cubebol imparted a freshness which does not change the organoleptic profile of the base composition, i.e. the sweets described above.

The freshness develops in the mouth after 2 to 3 minutes and lasts for approximately 20 to 25 mins.

The addition of 0.03% cubebol with 0.015% (1R,3R,4S)-3-menthyl 3,6-dioxa-heptanoate imparted a freshness of the same duration, but which developed after approximately 1 minute without changing the organoleptic profile of the sweets.

Example 2
Preparation of Chewing Gum

Chewing gum was prepared from a Cafosa Nevada Plus T 413-01 chewing-gum base (18 parts by weight) (origin: Cafosa Gum Products Technology, Barcelona, Spain), sugar (60 parts by weight), glucose (20 parts by weight) and glycerol (0.5 parts by weight). To this mixture were then added 0.8 parts by weight of citric acid and 0.8 parts by weight of grapefruit flavor having the following composition:

| Ingredients | Parts by weight |
| --- | --- |
| Styralyl acetate | 25 |
| Thiomenthone at 0.1% in ethanol | 30 |
| Grapefruit essence | 945 |
| Total | 1000 |

This chewing-gum base, without anything else added, was then compared on a blind test by expert flavorists with chewing gums of the same composition to which cubebol had been added.

The addition of 0.8% by weight of cubebol imparts to the chewing gum a sensation of freshness which develops in the mouth after a few minutes and lasts for approximately 20 to 25 minutes.

After adding 0.57% by weight of β-cyclodextrin containing 14% cubebol in the form of an inclusion complex (corresponding to 0.08% of cubebol in the final product), the flavorists observed an effect comparable to that achieved in the preceding test, not only with respect to the intensity of the freshness, but also its duration.

Example 3
Preparation of Lemon Sorbet

A lemon sorbet was prepared from the following ingredients by conventional methods:

| Ingredients | % by weight |
| --- | --- |
| Sugar | 15.00 |
| Glucose syrup 40 DE | 4.00 |
| Citric acid | 0.70 |
| Maleic acid | 0.30 |
| Lactic acid | 0.05 |
| Trisodium citrate (aqueous solution at 20%) | 0.20 |
| Meypyrogen ® IC 304[1)] | 0.35 |
| Water | 79.40 |
| Total | 100.00 |

[1)]Origin: Meyhall Chemical AG, Kreuzlingen, Switzerland 0.02% of lemon flavor having the following composition was then added:

| Ingredients | % by weight |
| --- | --- |
| Citronellyl acetate | 2 |
| Geranyl acetate | 6 |
| Linalyl acetate | 2 |
| Citronellol | 2 |
| Geraniol | 3 |
| Terpineol | 5 |
| Citral | 5 |

| Ingredients | % by weight |
| --- | --- |
| Lemon terpenes | 975 |
| Total | 1000 |

This sorbet, without anything else added, was then compared on a blind test by expert flavorists with a sorbet of the same composition to which cubebol according to the invention had been added.

In the opinion of the flavorists, the addition of 0.1% cubebol in the form of a solution at 50% in ethanol imparts a pleasant freshness which develops in the mouth a few seconds after ingestion of the sorbet. The freshness is perceptible for approximately 20 to 25 minutes.

Example 4
Preparation of a Grapefruit Drink

A grapefruit-flavored emulsion was prepared by mixing the following ingredients using conventional methods:

| Ingredients | % by weight |
| --- | --- |
| Grapefruit flavor[1)] | 0.76 |
| Gum ester 8 BG[2)] | 4.00 |
| Tenox ® GT-2[3)] | 0.02 |
| Emulgum[4)] | 5.00 |
| Citric acid | 0.30 |
| Ascorbic acid | 0.10 |
| Sodium benzoate | 0.10 |
| Cubebol at 25% in limonene | 8.00 |
| Demineralised water | 81.72 |
| Total | 100.00 |

[1)]See example 2
[2)]Origin: Hercules
[3)]Mixture of tocophenols; origin: Eastman Chemicals
[4)]Origin: CNI, Rouen, France A grapefruit drink containing 0.5% of this emulsion in water was then prepared. This drink was compared on a blind test by expert flavorists with a drink to which cubebol had not been added. In the opinion of the flavorists, the sample containing cubebol was enriched by a pleasant freshness which lasted for approximately 25 to 30 minutes, whereas this freshness was not perceptible in the sample without the addition of cubebol.

Example 5
Preparation of a Tooth Gel and a Toothpaste 0.3% cubebol combined with 1% mint oil was added to a tooth gel and a toothpaste of a conventional type, prepared for example from the following ingredients:

Tooth gel:

| Ingredients | % by weight |
| --- | --- |
| Sorbosil ® AC 77[1)] | 8 |
| Sorbosil ® TC 15[1)] | 9 |
| Sorbitol at 70% | 66.642 |
| PEG 1500 | 2 |
| Sodium lauryl sulphate | 2.1 |
| Sodium monofluorophosphate | 0.76 |
| Sodium salt of carboxymethylcellulose | 0.4 |
| Sodium salt of saccharin | 0.2 |

-continued

| Ingredients | % by weight |
|---|---|
| Blue colouring agent | 0.002 |
| Demineralised water | 10.896 |
| Total | 100.000 |

Toothpaste:

| Ingredients | % by weight |
|---|---|
| Sorbosil ® AC 77[1)] | 6.5 |
| Sorbosil ® TC 15[1)] | 9 |
| Sorbitol at 70% | 40 |
| Sodium lauryl sulphate | 1.5 |
| Sodium monofluorophosphate | 0.8 |
| Sodium salt of carboxymethylcellulose | 1.1 |
| Sodium salt of saccharin | 0.2 |
| $TiO_2$ | 0.5 |
| Demineralised water | 40.4 |
| Total | 100.00 |

[1)]silica-based thickening agent; origin: Corsfield Chemicals Ltd., Great Britain The products were then tested and evaluated on a blind test by expert flavorists. After using the product and rinsing the mouth, a freshness was experienced for each of the products which developed after rinsing and lasted for approximately 20 to 30 minutes. This effect is of longer duration than with other compounds having a refreshing effect, and the freshness harmonises well with the characteristic flavor of mint oil.

Example 6
Gelatin-based Confectionery

Confectionery was prepared from gelatin, into which were incorporated 0.15% by weight of orange flavor as specified in example 1 and 1% by weight of citric acid. This confectionery was compared with the same confectionery to which was also added 0.2% by weight of limonene containing 25% cubebol.

The confectionery containing the cubebol developed a pleasant and welcome freshness in the mouth after approximately 2 minutes, enhancing the characteristic flavor of orange. This freshness was not perceptible in the confectionery not containing cubebol.

What is claimed is:

1. A perfuming or flavoring composition containing as active ingredient (−)-(1R,4S,5R,6R,7S,10R)-7-isopropyl-4,10-dimethyl-tricyclo[4.4.0.0(1,5)]decan-4-ol.

2. A perfuming or flavoring composition according to claim 1, wherein (−)-(1R,4S,5R,6R,7S,10R)-7-isopropyl-4,10-dimethyl-tricyclo[4.4.0.0(1,5)]decan-4-ol is used in pure form.

3. A perfuming or flavoring composition according to claim 1, containing (−)-(1R,4S,5R,6R,7S,10R)-7-isopropyl-4,10-dimethyl-tricyclo[4.4.0.0(1,5)]decan-4-ol in the form of cubeb oil comprising at least 50% by weight of (−)-(1R, 4S,5R,6R,7S, 10R)-7-isopropyl-4,10-dimethyl-tricyclo [4.4.0.0(1,5)]decan-4-ol.

4. A perfuming or flavoring composition according to claim 1, substantially free of (−)-(1R,4R,5R,6R,7S, 10R)-7-isopropyl-4,10-dimethyl-tricyclo-[4.4.0.0(1,5)]decan-4-ol.

5. A perfuming or flavoring composition according to claim 1, containing (−)-(1R,4S,5R,6R,7S,10R)-7-isopropyl-4,10-dimethyl-tricyclo[4.4.0.0(1,5)]decan-4-ol in the form of an inclusion complex in α, β or γ cyclodextrin or a mixture thereof.

6. A perfuming or flavoring composition according to claim 1, further containing one or more refreshing agents.

7. A perfuming or flavoring composition according to claim 6, wherein said other refreshing agents are either derivatives of (−)-menthol, (−)-menthone or (−)-menthane, or a branched aliphatic amide.

8. A product, in the form of a flavoring composition for a beverage, ice cream or sorbet, sweet, confectionery item, dairy product, chewing gum, cigarette, chewing tobacco, pharmaceutical preparation or dental care product, containing (−)-(1R,4S,5R,6R,7S,10R)-7-isopropyl-4,10-dimethyl-tricyclo[4.4.0.0(1,5)]decan-4-ol.

9. A product in the form of an emulsion-based drink, fruit juice, soft drink, cold tea, chewing gum with or without sugar, sweet with or without sugar, pressed tablet, gelatin-based confectionery item, fruit jam or jelly, sorbet, dairy ice cream, tooth gel or toothpaste, mouth-wash or throat-wash, containing (−)-(1R,4S,5R,6R,7S,10R)-7-isopropyl-4,10-dimethyl-tricyclo[4.4.0.0(1,5)]decan-4-ol.

10. A product according to claim 8 in the form of a food or drink containing a flavor based on citrus fruits or with acid notes.

11. A product, in the form of a shampoo, shower or bath gel, deodorant or anti-perspirant, aftershave lotion or balm, shaving foam, massage oil or perfume, containing (−)-(1R, 4S,5R,6R,7S,10R)-7-isopropyl-4,10-dimethyl-tricyclo [4.4.0.0(1,5)]decan-4-ol.

12. A method for imparting perfuming flavoring or refreshing properties to a composition or product, which comprise adding a perfuming, flavoring or refrshing effective amount of (−)-(1R,4S,5R,6R,7S,10R)-7-isopropyl-4, 10-dimethyl-tricyclo[4.4.0.0(1,5)]decan-4-ol to the composition or product.

* * * * *

UNITED STATES PATENT AND TRADEMARK OFFICE
CERTIFICATE OF CORRECTION

PATENT NO.    : 6,214,788B1
DATED         : April 10, 2001
INVENTOR(S)   : Velazco et al.

It is certified that error appears in the above-identified patent and that said Letters Patent is hereby corrected as shown below:

Column 8,
Line 48, change "comprise" to -- comprises --.

Signed and Sealed this

Thirty-first Day of July, 2001

Attest:

*Attesting Officer*

NICHOLAS P. GODICI
*Acting Director of the United States Patent and Trademark Office*